Dec. 13, 1938.    H. P. MANLY    2,140,297
SHORT CIRCUIT TESTER FOR ELECTRONIC TUBES
Filed May 11, 1936

Inventor:
Harold P. Manly.
By: Brayton Richards
Attorney.

UNITED STATES PATENT OFFICE 2,140,297

SHORT CIRCUIT TESTER FOR ELECTRONIC TUBES

Harold P. Manly, Niles Center, Ill.

Application May 11, 1936, Serial No. 79,060

10 Claims. (Cl. 250—27)

The invention relates to improvements in short circuit testers for electronic tubes and has for its primary object the provision of an improved apparatus of the character indicated which is of simple construction and highly efficient in use.

Another object of the invention is the provision of a tube tester of the character indicated which when used for testing a short circuited tube will emit audible signals closely approaching the sounds which will result if the tube being tested is used in a radio receiving set, and contains a short circuit.

Other objects will appear hereinafter.

The invention consists in the combinations and arrangements of parts hereinafter described and claimed.

Figure 1:
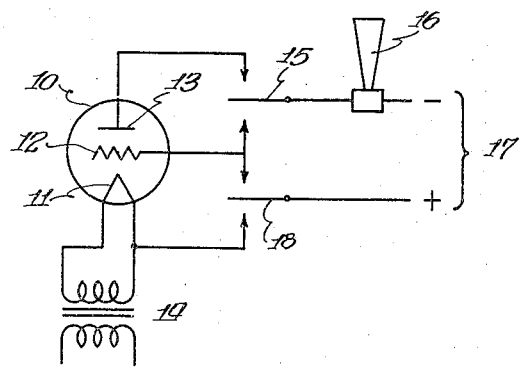
Figure 2:
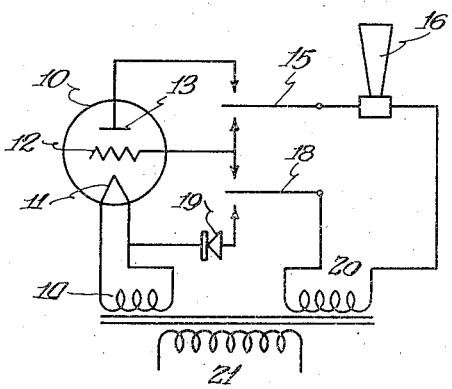
Figure 3:
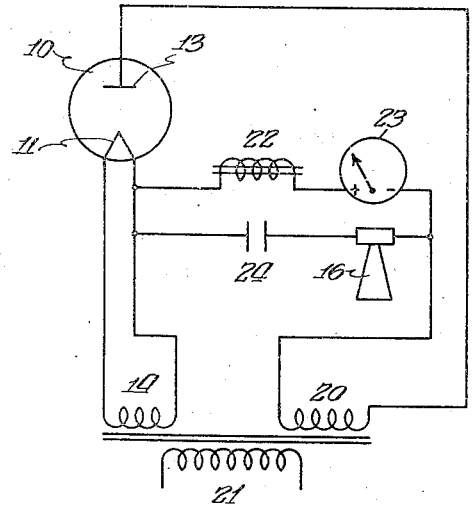
Figure 4:
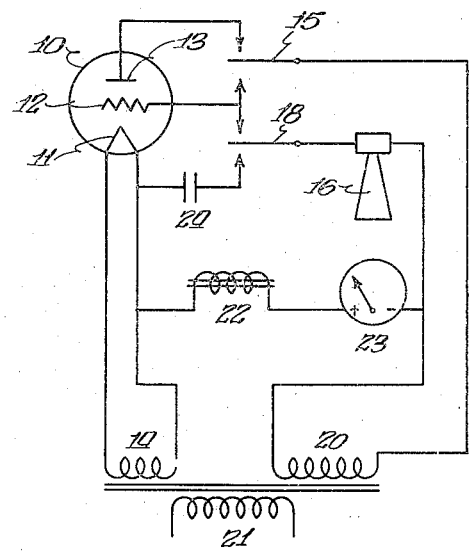

The invention will be best understood by reference to the accompanying drawing forming a part of this specification and in which Fig. 1 is a diagrammatic view of a testing apparatus embodying the invention and adapted for use in testing thermionic tubes for short circuits;

Fig. 2 a similar view of a modified form of apparatus in which a rectified alternating current is employed a portion of in the testing circuit;

Fig. 3 a diagrammatic view of another modified form of application of the invention shown as applied and used in testing a two-element thermionic tube; and Fig. 4 a similar view of the same type of apparatus shown as arranged for testing a three-element thermionic tube.

The embodiment of the invention illustrated in Fig. 1 comprises an apparatus arranged for the reception of an ordinary thermionic tube 10 provided with the usual cathode 11, grid 12, and plate 13, the cathode 11 being heated by means of transformer coils 14 connected in the usual way for this purpose.

A double pole switch 15 is arranged as shown in circuit with a telephone receiver 16 in a lead to a source of current 17 which may be an ordinary pulsating direct current as indicated by the plus and minus signs. Another double pole switch 18 is arranged as shown in a lead to the positive side of the source of current 17. Switch 15 is arranged in cooperative relationship with one contact in a lead from the plate 13 and another contact in the lead from the grid 12, while switch 18 is arranged in cooperative relationship with a contact in the lead from the grid 12 and another contact in a lead from the cathode 11.

By this arrangement when both of the switches 15 and 18 are swung downwardly, the cathode 11 is made positive and the grid 12 negative so that the flow of emission current in the tube is thereby prevented. Any flow of current due to secondary emission, or the small current flowing into a negatively charged grid, or current due to ionization will all be prevented by choice of suitable potential differences between electrodes. In this way, all flow of emission current through the tube will be positively prevented. However, should there be contact or other short circuit connection between the cathode and grid short circuited direct pulsating current will flow from the source 17 through switch 18, cathode 11, grid 12, switch 15, and back through telephone receiver 16, thus actuating said telephone receiver as a loud speaker to emit sounds which will closely approach the sounds which will be emitted in a receiving set should such a short circuit or defective tube be employed therein, thus affording an actual practical demonstration of the defectiveness of said tube in that respect. If both of the switches 15 and 18 are moved upwardly, the cathode 11 is disconnected from the source of current and consequently there will be no flow of an emission current from any other element connected to the source of current. At the same time the grid 12 and plate 13 are connected to the source 17 through the receiver 16 so that any short circuit between these two elements will allow short circuit current to flow through the receiver with the same results as before. This affords a test for a short circuit between the grid and plate.

With switch 15 moved upward and switch 18 downward, the cathode 11 is again connected to the positive side of source 17, thus preventing flow of emission current while plate 13 is connected to the negative side of the source through the receiver 16. However, any short circuit current flowing through the cathode and plate will actuate receiver 16, as above described. Thus the apparatus set forth constitutes a simple and effective means for testing such tubes for short circuits which gives an actual audible demonstration of the effect of the use of a defective tube and such audible demonstration will not be influenced or affected in any way by flow of emission current during the test because the arrangement is such as to prevent all flow of emission current through the testing circuit and therefore through the indicator. In this connection it is also to be noted that a telephone receiver may be used which is very sensitive to the flow of short circuit current so that the apparatus disclosed will consequently be very sensitive and capable of discovering and audibly demonstrating any short circuited defects in such tubes.

In Fig. 2 I have illustrated a modified form of apparatus in which a section of the secondary winding 20 of transformer 21 is employed as the source of current. A rectifier 19 is arranged as shown in the cathode lead in such manner that current may flow to the cathode but not away from it through the rectifier. This will prevent all flow of emission current through the tube and thus the same results obtained as above set forth.

In Fig. 3 I have illustrated a modified form of construction in which flow of emission current is permitted through the tube, but provisions are made whereby the telephone receiver 16 is unaffected by such emission flow. To this end a choke coil 22 is included with a direct current indicator 23 in the cathode lead from one end of the transformer winding 20. A condenser 24 is included in another cathode lead with the telephone receiver 16 as indicated. The other end of the transformer winding 20 is connected as shown with the plate 13 of the tube 10, which in this instance is shown as a two-element tube without a grid. The choke coil 22 will permit practically free flow of direct current but will oppose or impede the flow of alternating current so that emission current may flow through this lead and indicator 23. The condenser 24 will permit the flow of alternating current but will prevent the flow of direct current, so that there can be no flow of emission current through the lead including the telephone receiver 16. Should there be a short circuit between the plate 13 and cathode 11, alternating current from transformer winding 20 will flow through this short circuit path, condenser 24, audible indicator 16, and back to the winding 20, thereby actuating the telephone receiver as before in case a short circuit is present in the tube. However, as above stated, no flow of emission current will be permitted through the lead which includes the telephone receiver so that the sounds emitted by the receiver during the test will be due solely to the flow of short circuit current and uninfluenced or unaffected in any way by the flow of the emission current through the tube.

In Fig. 4 I have shown a modification of the apparatus shown in Fig. 3 arranged for testing a grid tube, the choke coil 22 and condenser 24 being arranged as shown in conjunction with the switches 15 and 18 to insure that the telephone receiver 16 will be unaffected by any emission current flowing through the tube 10. With the switches 15 and 18 manipulated as described above for checking the presence of short circuits between tube elements 11, 12 and 13, any short circuit current will flow through the telephone receiver 16, but no emission current will be permitted to flow through said receiver, so that the sounds emitted by the receiver will always be solely due to the flow of short circuit current, if any there be.

Each of the foregoing exemplifications of the invention will provide simple and effective apparatus for testing electronic tubes for short circuits. A telephone receiver is one of the most sensitive means of indicating a momentary current and thus will readily translate the slightest current or change into a readily recognizable sound. Thus in the various arrangements disclosed any slight momentary current such as would be caused by a loose tube element jarred into contact with another by vibration of the tube, will be positively and unmistakably indicated.

While I have illustrated and described the preferred forms of construction for carrying the invention into effect, these are capable of variation and modification without departing from the spirit of the invention. I therefore do not wish to be restricted to the precise details set forth, but desire to avail myself of such variations and modifications as fall within the scope of the appended claims.

I claim:

1. A tube tester comprising a testing circuit including two of the elements of an electronic tube, a source of current and an audible indicator in series with said elements; and means for preventing flow of emission current from affecting said indicator.

2. A tube tester comprising a testing circuit including two of the elements of an electronic tube, a source of current and a telephone receiver in series with said elements; and means for preventing flow of emission current from affecting said receiver.

3. A tube tester comprising a testing circuit including a cathode and another element of an electronic tube and means for heating a tube cathode; an audible indicator; a source of current; and connections and switches for supplying a positive charge from said source to the tube cathode and a negative charge to another tube element through said indicator in series.

4. A tube tester comprising a testing circuit including a cathode and another element of an electronic tube and means for heating a tube cathode; a telephone receiver; a source of current; and connections and switches for supplying a positive charge from said source to the tube cathode and a negative charge to another tube element through said receiver in series.

5. A tube tester comprising a testing circuit including a cathode and another element of an electronic tube and means for heating a tube cathode; an audible indicator; a source of pulsating direct current; and connections and switches for supplying a positive charge from said source to the tube cathode and a negative charge to another tube element through said indicator in series.

6. A tube tester comprising a testing circuit including a cathode and another element of an electronic tube and means for heating a tube cathode; a telephone receiver; a source of pulsating direct current; and connections and switches for supplying a positive charge from said source to the tube cathode and a negative charge to another tube element through said receiver in series.

7. A tube tester comprising a testing circuit including a cathode and another element of an electronic tube and means for heating a tube cathode; a source of alternating current; a cathode lead from one side of said source including an audible indicator and means for preventing the flow of emission current through said indicator; and a lead from the other side of said source to another tube element.

8. A tube tester comprising a testing circuit including a cathode and another element of an electronic tube and means for heating a tube cathode; a source of alternating current; a cathode lead from one side of said source including a telephone receiver and means for preventing the flow of emission current through said receiver; and a lead from the other side of said source to another tube element.

9. A tube tester comprising a testing circuit including a cathode and another element of an electronic tube and means for heating a tube cathode; a source of alternating current; a lead from the said source including an audible signal indicator and a switch; a cathode lead including means for preventing the flow of emission current and a contact cooperating with said switch to close the circuit through said indicator to the cathode; a lead from another element of the tube including a contact cooperating with said switch to close said circuit through said indicator to said other element; a lead from the other side of said source including a second switch; a contact in the lead from said other element cooperating with said second switch; and a lead from another tube element including another contact cooperating with said second switch.

10. A tube tester comprising a testing circuit including a cathode and another element of an electronic tube and means for heating a tube cathode; a source of alternating current; a lead from the said source including a telephone receiver and a switch; a cathode lead including means for preventing the flow of emission current and a contact cooperating with said switch to close the circuit through said receiver to the cathode; a lead from another element of the tube including a contact cooperating with said switch to close said circuit through said receiver to said other element; a lead from the other side of said source including a second switch; a contact in the lead from said other element cooperating with said second switch; and a lead from another tube element including another contact cooperating with said second switch.

HAROLD P. MANLY.